United States Patent [19]
Quesinberry et al.

[11] 3,821,738
[45] June 28, 1974

[54] ANTENNA POSITIONING SYSTEM AND METHOD

[75] Inventors: Elmen C. Quesinberry, Severna Park; Clarence C. Glover, Baltimore; Brewton O. Van Hook, Ellicott City, all of Md.

[73] Assignee: Westinghouse Electric Corporation, Pittsburgh, Pa.

[22] Filed: July 31, 1972

[21] Appl. No.: 276,344

[52] U.S. Cl. ..................... 343/7.4, 343/9, 343/16 M
[51] Int. Cl. ............................................... G01s 9/22
[58] Field of Search ............. 343/7.4, 9, 16 R, 16 M

[56] References Cited
UNITED STATES PATENTS

| | | | |
|---|---|---|---|
| 3,078,455 | 2/1963 | Brainin | 343/7.4 X |
| 3,123,822 | 3/1964 | Shelley et al. | 343/7.4 |
| 3,140,482 | 7/1964 | Duncan et al. | 343/9 X |
| 3,377,470 | 4/1968 | Ausman | 343/16 R X |
| 3,750,174 | 7/1973 | Belluck | 343/7.4 X |

*Primary Examiner*—T. H. Tubbessing
*Attorney, Agent, or Firm*—C. L. O'Rourke

[57] ABSTRACT

A system for positioning an antenna of a tracking radar system, particularly of the type employing a driven beam reflector of the type utilized in a cassegrain antenna system, without the use of rate gyros. A target line-of-sight error signal representing the error between the radar beam line-of-sight and the target line-of-sight in a line-of-sight coordinate system is generated and then referenced to a fixed coordinate system. In a radar system employing an antenna having an axis system corresponding to the beam line-of-sight axis system, the line-of-sight error signal is referenced to the fixed coordinate system by first referencing the error signal to an aircraft axis system and then to the fixed coordinate system to obtain a fixed coordinate referenced error signal. The fixed coordinate referenced line-of-sight error signal may then be employed to generate fixed coordinate referenced line-of-sight error rate and position signals through the use of a predetermined transfer function and an integrator having a predetermined, fixed coordinate system referenced constant of integration. The line-of-sight position signals referenced to the fixed coordinate system may then be used to generate antenna angular pointing error signals which may be used to drive the antenna in a direction tending to null the line-of-sight error signal. In a system employing a driven beam reflecting element such as in a cassegrain system, the rotation affect of the reflector on the beam is taken into account in referencing the line-of-sight error signals to the fixed coordinate system. Moreover, the complex relationship between beam position and reflector position is accounted for in transforming to and from the fixed coordinate system. A method and system for generating line-of-sight angular rate signals for use in fire control systems is also disclosed.

50 Claims, 10 Drawing Figures

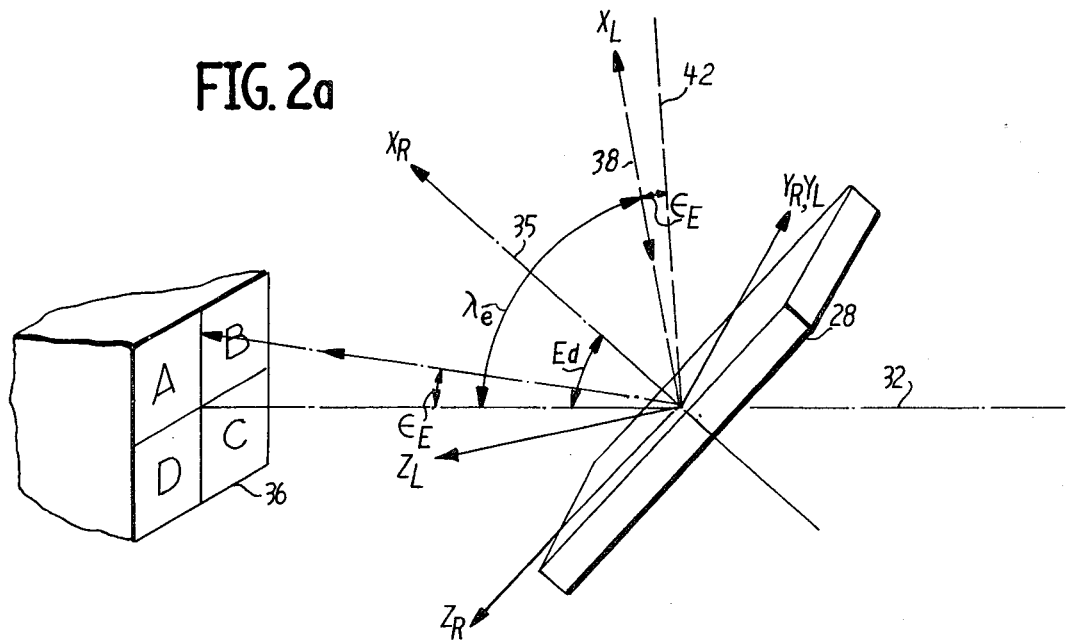
FIG. 2a
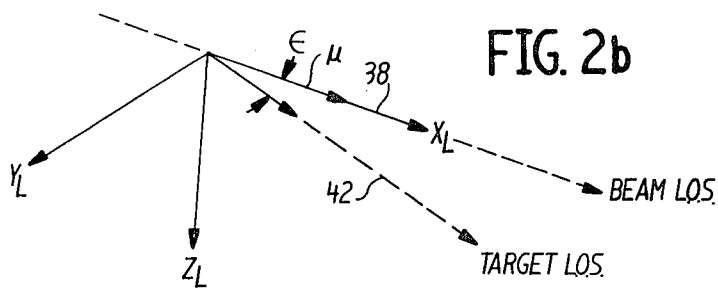
FIG. 2b
FIG. 2c
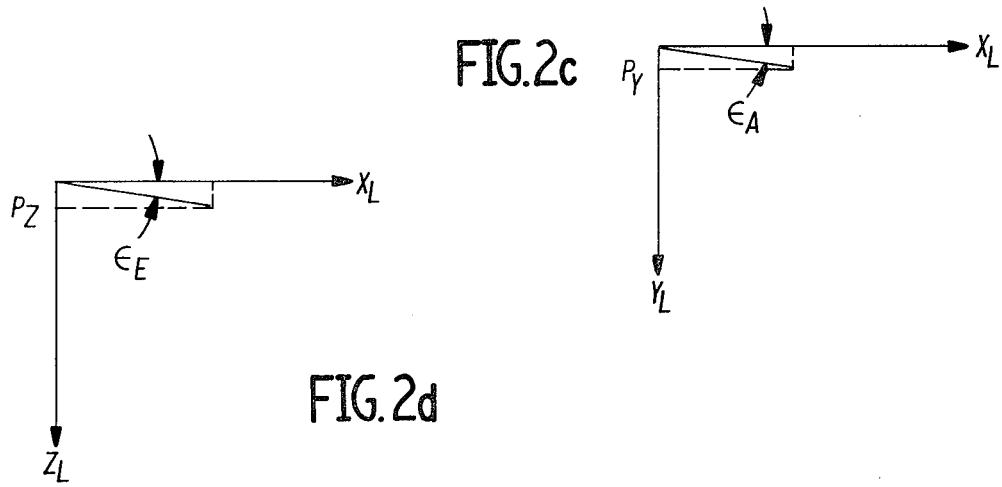
FIG. 2d

3,821,738

ANTENNA POSITIONING SYSTEM AND METHOD

RELATED APPLICATIONS

Copending United States patent application of Heller et al Ser. No. 276,534 filed Aug. 31, 1972, discloses a digital radar antenna positioning system related to the system disclosed herein.

BACKGROUND OF THE INVENTION

1. Field of the Invention

The present invention relates to radar system and, in particular, to a method and apparatus for positioning a radar system antenna particularly of the type employing a driven beam steering reflector, e.g., a cassegrain antenna, wherein the reflector position is related to the radar beam position by a complex function.

2. State of the Prior Art

In a typical antenna drive servo system utilized in radar systems having angle tracking capabilities, the angular position of the line-of-sight to the target is ordinarily directly available from the angular position of the antenna or some mechanical element aligned with the radar beam. Other required quantities, such as the angular rate of the line-of-sight, may be obtained directly from the angular position of the antenna through the use of rate gyros slaved to the mechanical element aligned with the radar beam.

Cassegrain antenna systems typically employ a non-rotatable antenna and, in closed association therewith, a reflecting element from which the radar beam is reflected toward the target. The typically lightweight reflecting element is driven in asimuth and elevation to change the radar beam position. Significant size and weight reductions in the antenna systems are thus achieved.

However, in a cassegrain antenna system there is no mechanical element directly aligned with or movable in a one-to-one relationship with the radar beam. While the radar beam angular position is related to the deflection angle of the driven reflecting element relative to a set of predetermined axes, it has been found that this relationship may be extremely complex particularly in a system in which the reflector axes are gimbaled on a platform which is free to move relative to the line-of-sight to the target as is the situation in an airborne radar system. Since neither the reflector nor any other mechanical element of the system is directly aligned with the radar beam, the making of measurements of the target line-of-sight or beam position and angular rate by conventional techniques is impractical.

For example, rate gyros slaved to the reflector can provide indications of the angular rates of reflector movement in azimuth, elevation and roll. However, the resulting rate indications from the rate gyros are not equal to the angular rates of movement of the line-of-sight to the target.

Slaving rate gyros directly to the reflector requires additional rate gyros slaved to the movable platform, i.e., the aircraft, as well as complex signal processing in order to obtain the desired line-of-sight angular rates. If the rate gyros slaved to the aircraft are to be eliminated, an intricate mechanical model which takes into account the complex relationship between reflector position and beam position must be interposed between the reflector and each rate gyro. In addition, the use of rate gyros may significantly detract from the advantageous reduction in size and weight obtained through the use of the cassegrain antenna type system.

OBJECTS AND SUMMARY OF THE INVENTION

It is accordingly an object of the present invention to provide a novel method and system for positioning and determining the position of a radar beam in a radar system employing a beam steering reflecting element such as a cassegrain antenna.

It is another object of the present invention to provide a novel method and system for tracking a target wherein the necessity for rate gyros is obviated in the angle tracking loop.

It is yet another object of the present invention to provide a novel method and radar tracking system wherein angular information including the sensed tracking error of the radar is referenced to a fixed coordinate system and rates are calculated from this information in lieu of using rate gyro data in the tracking loop.

It is yet a further object of the present invention to provide a novel method and system for stabilizing steerable beam devices having no physical elements aligned with the line-of-sight to the tracked object.

These and many other objects and advantages are accomplished in accordance with the present invention in a radar system employing an antenna mounted on a movable platform such as an aircraft by transforming a sensed tracking error signal referenced to the radar beam into a target line-of-sight direction error signal referenced to a fixed coordinate system such as an earth or any relatively inertial coordinate system. The target line-of-sight direction error signal in the fixed coordinate system is utilized to generate a target line-of-sight direction signal and the target line-of-sight direction signal is then utilized to generate angular antenna pointing error signals to drive the antenna at the proper rate and in the proper direction to track the target. To facilitate signal processing and to eliminate ambiguities at poles, the signals employed are preferably in the forms of three component direction cosines.

The invention accounts for a rotational affect of a cassegrain antenna on the radar beam and also takes advantage of the relationship between the sensed tracking error signals and the direction cosines of the beam line-of-sight. Moreover, the system provides target line-of-sight angular rates where required for computing target rates for gun fire control systems and the like. Since rates are computed from the stabilized line-of-sight direction error vector, rate gyros are not required.

The above objects and advantages of the present invention will become apparent to one skilled in the art to which it pertains from the following detailed description read in conjunction with the attached drawings.

BRIEF DESCRIPTION OF THE DRAWINGS

FIG. 2 is a schematic representation of a portion of the system of FIG. 1;

FIGS. 2b–2d are graphs illustrating the relationships between beam and target lines-of-sight of the system of FIG. 1;

DETAILED DESCRIPTION

Figure 1:
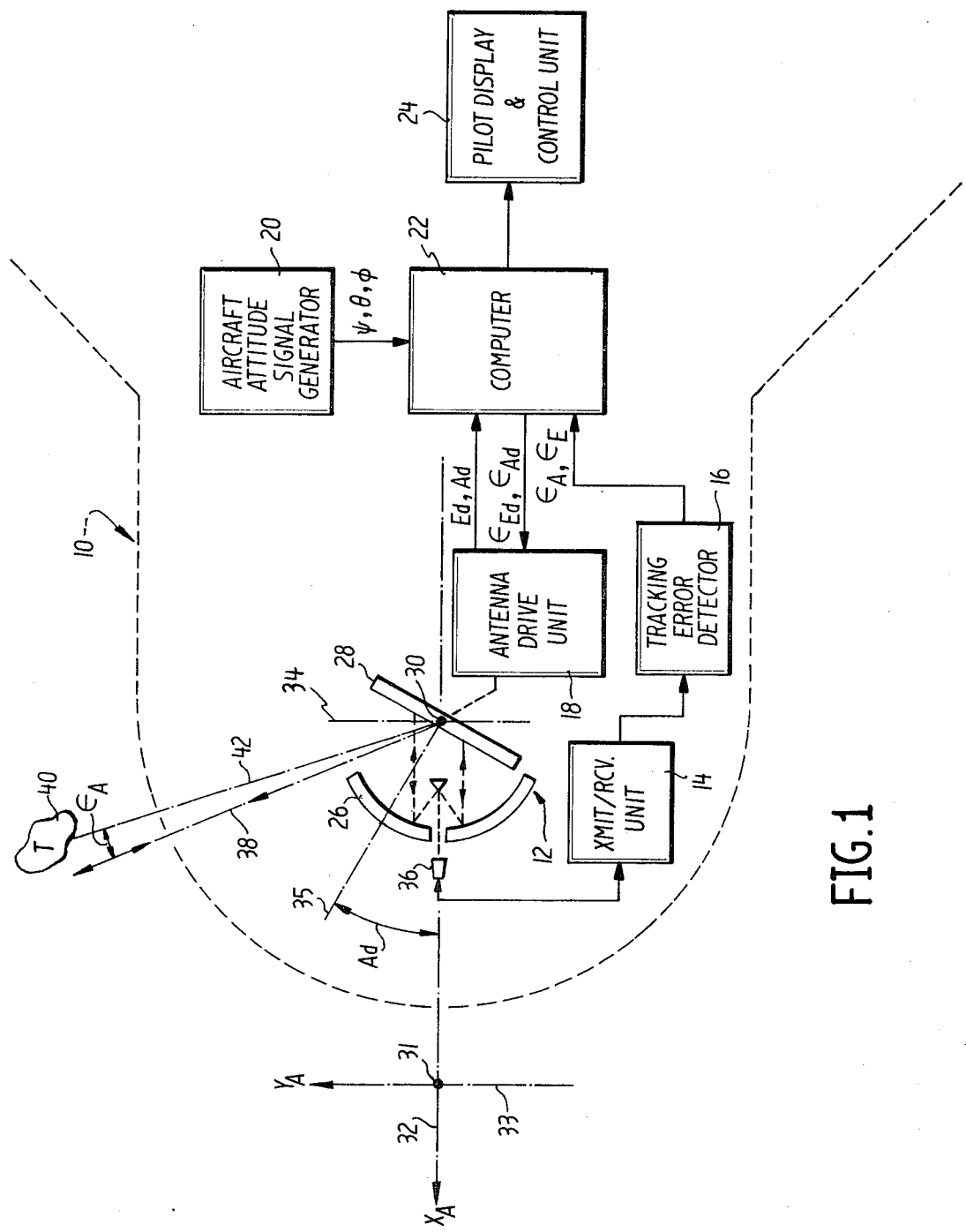
FIG. 1 is a functional block diagram of a radar system operable in accordance with the present invention.

A radar system operable in accordance with the present invention is illustrated in FIG. 1. Since the invention has particular utility in the environment of an airborne radar system, the illustrated embodiment is shown in FIG. 1 in this environment in the forward portion of an aircraft 10 and is described hereinafter in this connection. It should, however, be understood that the invention is not limited to this application.

Referring to FIG. 1, the system generally includes an antenna assembly 12, a suitable conventional transmitter/receiver unit 14, a suitable conventional tracking error detector 16, a suitable conventional antenna drive unit 18, a suitable conventional aircraft attitude signal generator 20, a computer 22, and a pilot display and control unit 24.

The antenna 12 is preferably a cassegrain type antenna and may include a sub-reflector 26 and a twist reflector 28. The twist reflector 28 may be gimbaled for movement in azimuth about a generally vertically disposed axis 30 orthogonal to the longitudinal axis 32 of the aircraft. Likewise, the twist reflector 28 may be gimbaled for rotational movement in elevation about a generally horizontally disposed gimbal axis 34 orthogonal to the aircraft axis 32.

To facilitate the description hereinafter, the aircraft may be assumed to have orthogonal axes of rotation in azimuth and elevation generally indicated respectively at 31 (projecting into the paper) and 33 normal thereto. The aircraft roll axis corresponds to the longitudinal axis 32 of the aircraft. A right-hand, three-space aircraft coordinate system having axes $X_A$ and $Y_A$ as illustrated in FIG. 1 and a third axis $Z_A$ (positive in a direction into the paper) may be set up to define, as shown in FIG. 2, the aircraft attitude relative to a selected right-hand, 3-space fixed coordinate system such as an earth coordinate system having axes north (X), east (Y) and down (Z). Moreover, the position of the twist reflector 28 may be defined relative to the aircraft axes $X_A$, $Y_A$ and $Z_A$ from a right-hand, orthogonal reflector axis system $X_R$, $Y_R$ and $Z_R$.

For example, and as illustrated, the reflector 28 angular position in azimuth may be defined as the angle $Ad$ between a line 35 ($X_R$ axis) normal to the surface of the reflector 28 and the aircraft axis 32 ($X_A$) measured in the $X_A$–$Y_A$ plane. The reflector 28 angular position in elevation may be defined as the angle $Ed$ between the $X_R$ axis and the $X_A$–$Y_A$ plane measured in the $X_R$–$Z_A$ plane.

Likewise, the attitude of the aircraft in azimuth relative to a selected fixed coordinate system may be defined in any suitable conventional manner as, for example, the angle $\psi$ between the axis 32 ($X_A$) and the X axis of the selected coordinate system, e.g., north in any earth system, measured in the X–Y plane or north-east plane of the fixed coordinate system. The attitude of the aircraft in elevation relative to the fixed coordinate system may be defined in any suitable conventional manner as, for example, the angle $\theta$ between the aircraft axis 32 ($X_A$) and the X–Y plane measured in the $X_A$–Z plane. Finally, the aircraft roll angle relative to the fixed coordinate system may also be defined in any suitable conventional manner as, for example, the angle $\phi$ measured clockwise about the aircraft $X_A$ axis from the X–Y plane to the $Y_A$ axis.

As used herein, the symbols representing angular quantities such as the symbols $Ad$ and $Ed$ representing reflector 28 angular azimuth and elevation positions are utilized to represent both the angular positions and the signals which represent these angular quantities. Thus, the angular quantities $Ad$ and $Ed$ represent reflector angles and also represent the electrical or mechanical signals by which these angles are represented for processing in the system.

With continued reference to FIG. 1, wave energy from the transmitter/receiver unit 14 may be directed to a feedhorn 36 disposed either behind the sub-reflector 26 as illustrated or behind the twist reflector 28. In either feedhorn arrangement, the wave energy from the feedhorn 36 strikes the sub-reflector 26 as horizontally polarized wave energy and, because of the reflective characteristics of the sub-reflector 26, is reflected toward the twist reflector 28. The horizontally polarized wave energy from the sub-reflector 26 strikes the twist reflector 28 and is reflected from the surface thereof as a vertically polarized conical beam having a central axis generally indicated at 38 in the drawing. The vertically polarized conical beam freely passes through the sub-reflector 26 toward a target 40.

Assuming that a portion of the beam strikes the target 40, energy is reflected to the antenna 12 and is directed to the receiver portion in the transmitter/receiver unit 14. The tracking error detector 16 then utilizes the signal reflected from the target 40 to generate azimuth and elevation angle tracking errors $\epsilon_A$ and $\epsilon_E$, respectively. The quantities $\epsilon_A$ and $\epsilon_E$ represent the angular error between the centerline or the line-of-sight 38 of the transmitted beam and the line-of-sight 42 to the target 40.

The error signals $\epsilon_A$ and $\epsilon_E$ from the tracking error detector 16 may be applied to the computer 22 and there utilized, in conjunction with aircraft attitude information from the aircraft attitude signal generator 20 and reflector position information from the antenna drive unit 18, to generate reflector error signals $\epsilon_{Ad}$ and $\epsilon_{Ed}$. The error signals $\epsilon_{Ad}$ and $\epsilon_{Ed}$ may then be applied to the antenna drive unit 18 to position the twist reflector 28 in azimuth and elevation, respectively, such that the angular azimuth and elevation errors between the beam line-of-sight 38 and the target line-of-sight 42 are eliminated.

To facilitate an understanding of the invention, the generation of the error signals $\epsilon_A$ and $\epsilon_E$ by the tracking error detector 16 and the quantities which these signals represent are described hereinafter in connection with FIGS. 2a–2d.

The error signals $\epsilon_A$ and $\epsilon_E$ may be obtained in any suitable conventional manner such as through the use of a four quadrant detector as is shown in FIG. 2a. Referring now to FIG. 2a, the wave energy from the transmitter is transmitted outwardly along the beam line-of-sight 38 and returned along the target line-of-sight 42. Assuming that only an elevation error $\epsilon_E$ exists between the beam and the target lines-of-sight, the returned energy strikes the feedhorn 36, e.g., the illustrated four-quadrant detector, and the return energy detected in each quadrant A to D is summed to obtain elevation and azimuth tracking errors. For example, the aximuth tracking error may be provided in accordance with the following equation:

$$\epsilon_A = [(A + D) - (B + C)]/(A + B + C + D)$$

Likewise, the elevation error may be given by the following equation:

$$\epsilon_E = [(A + B) - (C + D)]/(A + B + C + D)$$

The actual detected tracking error signals $\epsilon_A$ and $\epsilon_E$ thus represent angular tracking errors. For example, as is illustrated in FIG. 2b–2d, a right-hand, three-space line-of-sight coordinate system having orthogonal axes $X_L$, $Y_L$ and $Z_L$ may be established with the axis $X_L$ corresponding to the beam line-of-sight 38. In the situation in which the beam and target lines-of-sight coincide, there is no tracking error and the direction to the target may be represented by a unit vector $u$ (i.e., a vector $u$ of length one) coincident with the beam line-of-sight. This unit vector $u$ has components $u_X$, $u_Y$ and $u_Z$ which, with no tracking error, are given as direction cosines 1,0,0 (the 1 representing the length of the projection of the vector onto the $X_L$ axis, and the 0's representing the lengths of the projections of the vector onto the $Y_L$ and $Z_L$ axes, respectively).

If, on the other hand, the target line-of-sight 42 is displaced by an angle $\epsilon$ from the beam line-of-sight 38, the unit vector $u$ representing the line-of-sight to the target is displaced from the $X_L$ axis by the angle $\epsilon$. This angle $\epsilon$ has a component $\epsilon_A$ in the horizontal or azimuth plane defined by the axes $X_L$ and $Y_L$ (FIG. 2c) and a component $\epsilon_E$ in the vertical or elevation plane defined by the axes $X_L$ and $Z_L$ (FIG. 2d). These components $\epsilon_A$ and $\epsilon_E$ represent the respective azimuth and elevation angular errors between the beam and target lines-of-sight and correspond to the signals $\epsilon_A$ and $\epsilon_E$ generated as tracking error signals.

It may be validly assumed that the azimuth and elevation error signals $\epsilon_A$ and $\epsilon_E$ in the respective azimuth and elevation planes are very small angular quantities when the system is placed in track mode. Thus, in both the azimuth and elevation line-of-sight planes as shown in FIGS. 2c and 2d, respectively, the projections of the unit vector $u$ onto the X axis is approximately equal to the unit vector length, i.e., approximately equal to 1. The projection of the unit vector $u$ onto the Y axis is equal to (Sin $\epsilon_A$ cos $\epsilon_E$) which, for small angles, is approximately equal to $\epsilon_A$. Likewise, the projection of the elevation angle $\epsilon_E$ onto the $Z_L$ axis is approximately equal to the angle $-\epsilon_E$ for small angles (the minus sign accounting for the downward direction of the Z axis).

It can thus be seen that the respective azimuth and elevation angle tracking error signals $\epsilon_A$ and $\epsilon_E$ may be used to represent the deviation of a unit vector $u$ from a zero tracking error positions, i.e., to represent the direction cosine errors, with respect to the beam line-of-sight, of a unit vector pointing along the target line-of-sight. Of course, when the beam line of sight 38 is aligned with the line-of-sight 42 to the target, the unit vector may be represented by its projections along the line-of-sight axes $X_L$, $Y_L$ and $Z_L$ by the quantities 1, 0, 0 respectively.

In the event that the beam and target lines-of-sight are not aligned, the change in the $X_L$ projection is negligible in track mode so this change or deviation of the $X_L$ projection from the zero track error position is assumed to be zero. The deviations of the $Y_L$ and $Z_L$ projections (initially zero with no tracking error) are approximately equal to the angle tracking errors $\epsilon_A$ and $\epsilon_E$, respectively. Thus, these deviations along the axes $X_L$, $Y_L$ and $Z_L$ may be represented by the quantities 0, $\epsilon_A$ and $-\epsilon_E$, respectively.

As can be seen from FIG. 2a, the reflector axes $X_R$, $Y_R$ and $Z_R$ are not coincident with the beam line-of-sight axes $X_L$, $Y_L$ and $Z_L$. The respective reflector azimuth and elevation position angles Ad and Ed are thus not equal to the respective azimuth and elevation beam line-of-sight positions angles $\lambda_a$ and $\lambda_e$ measured with respect to the aircraft axes. It has been found that the relationship between these angles may be expressed by the following equation:

$$\lambda_a = \tan^{-1} [\cos^2 Ed \sin(2Ad)]/[(2 \cos^2 Ed)(\cos^2 Ad) - 1] \quad (1)$$

$$\lambda_e = \sin^{-1} [\cos Ad \sin(2Ed)] \quad (2)$$

Moreover, it has been found that the reflector 28 has a peculiar rotational affect on the beam when both the reflector azimuth and elevation angles Ad and Ed are unequal to zero. Thus, this rotational affect must be accounted for when transforming quantities from the beam line-of-sight axis system to the reflector, aircraft or fixed axis systems. This may be accomplished through the use of a derotation matrix C expressed as follows:

$$C = \frac{1}{\cos \lambda A \cos \lambda e + 1} \begin{vmatrix} \cos \lambda a + \cos \lambda e & -\sin \lambda a \sin \lambda e \\ \sin \lambda a \sin \lambda e & \cos \lambda a + \cos \lambda e \end{vmatrix} \quad (3)$$

As will hereinafter become apparent, the transformation of an angular quantity from the beam line-of-sight axes system to the aircraft axes system requires a transformation which takes into account both the angular relationships of equations (1) and (2) and the derotation affect of equation (3). When these affects are combined into one transform, hereinafter referred to as the T transform, the only angular quantities required are the angles to be transformed and the reflector position angles Ad and Ed. Thus the target line-of-sight direction cosine errors $\epsilon_A$ and $\epsilon_E$ previously discussed may be transformed into direction cosine errors $T_X$, $T_Y$ and $T_Z$ referenced to the aircraft axes as follows:

$$\begin{bmatrix} T_X \\ T_Y \\ T_Z \end{bmatrix} = [T] \begin{bmatrix} 0 \\ \epsilon_A \\ -\epsilon_E \end{bmatrix} \quad (4)$$

where:

$$[T] = \begin{bmatrix} (2 \cos^2 A_d \cos^2 E_d - 1) & -(\cos^2 E_d \sin 2 A_d) & (\cos A_d \sin 2 E_d) \\ (\cos^2 E_d \sin 2 A_d) & -(2 \cos^2 E_d \sin^2 A_d - 1) & (\sin A_d \sin 2 E_d) \\ (-\cos A_d \sin 2 E_d) & (\sin A_d \sin 2 E_d) & (\cos 2 E_d) \end{bmatrix} \quad (5)$$

Figure 3:
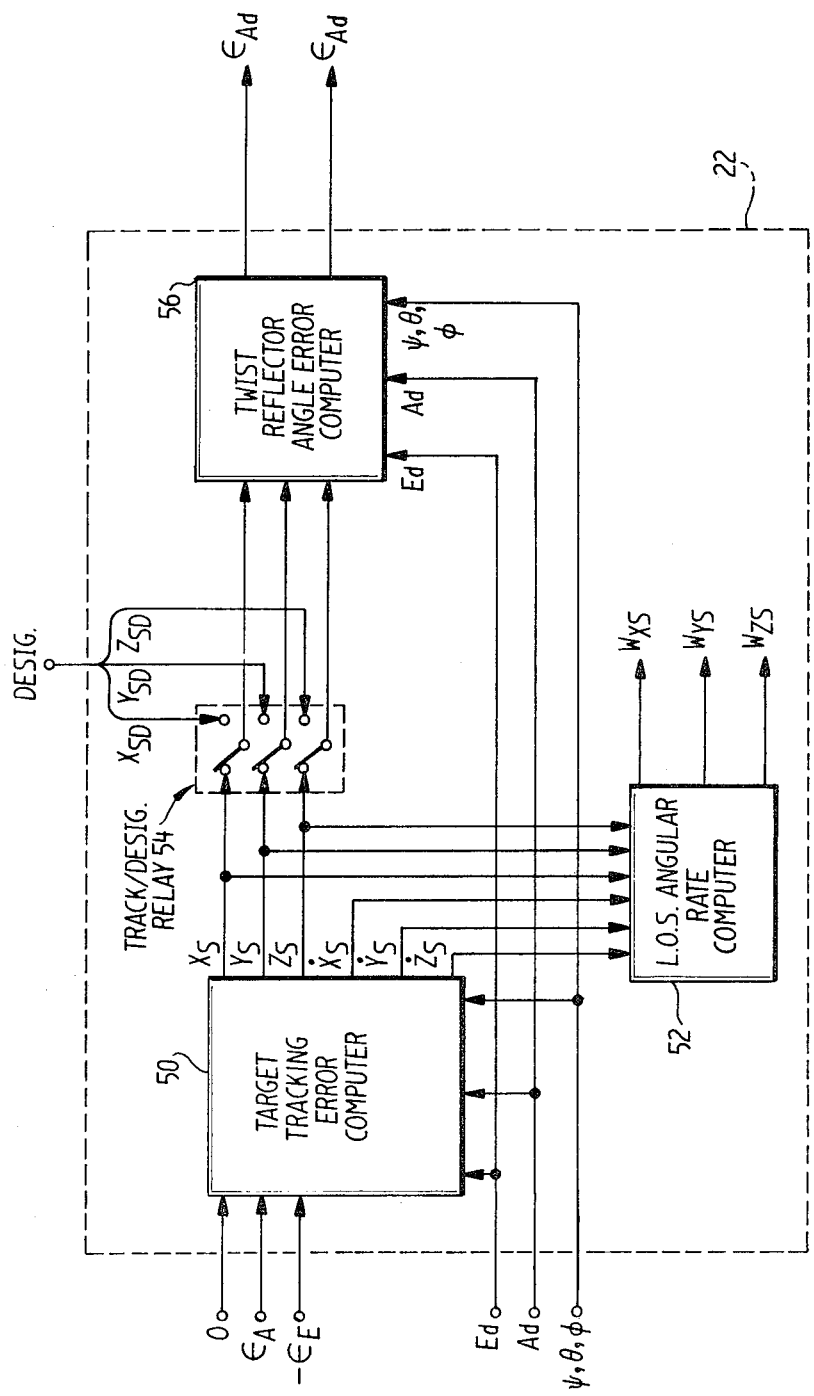
FIG. 3 is a functional block diagram of the computer of FIG. 1.

With the foregoing in mind and with reference now to FIG. 3 wherein the computer 22 of FIG. 1 is illustrated in greater detail, the tracking error direction cosine signals 0, $\epsilon_A$ and $-\epsilon_E$ representing deviations of a unit vector from the beam line-of-sight axes $X_L$, $Y_L$ and $Z_L$, respectively, are applied to a target tracking error computer 50. The signals E$d$ and A$d$ representing the angular elevation and azimuth positions of the twist reflector 28 are supplied to the target tracking error computer 50 from the antenna drive unit 18 of FIG. 1 and the signals $\psi$, $\theta$, and $\phi$ representing aircraft attitude relative to a fixed coordinate system are supplied to the tracking error computer 50 from the aircraft attitude signal generator 20 of FIG. 1.

The calculated target line-of-sight direction cosines $X_S$, $Y_S$ and $Z_S$ relative to the selected fixed coordinate system, e.g., the earth coordinate system, may be applied from the target tracking error computer 50 to a line-of-sight angular rate computer 52. The target line-of-sight direction cosine rates $\dot{X}_S$, $\dot{Y}_S$ and $\dot{Z}_S$ may also be applied to the line-of-sight angular rate computer 52. The angular rate computer 52 may provide line-of-sight angular rate signals $w_{XS}$, $w_{YS}$ and $w_{ZS}$ which may be utilized, in conjunction with target range, for example, to compute target lead angles and the like when the tracking system of the present invention is utilized in connection with a system such as a gun fire control system wherein these values are required.

The line-of-sight direction cosines $X_S$, $Y_S$ and $Z_S$ in the fixed coordinate system may also be applied through a suitable track/designate selector such as the relay generally indicated at 54. The designate or DESIG signal from the pilot display and control unit 24 of FIG. 1 may also be applied to the relay 54 and the signal selected by the relay 54 may be applied to a twist reflector angle error computer 56. The reflector elevation and azimuth position signals Ed and Ad may also be applied to the twist reflector angle error computer 56 together with the aircraft attitude signals $\psi$, $\theta$ and $\phi$. The twist reflector angle error computer may provide the output signals $\epsilon_{Ad}$ and $\epsilon_{Ed}$ to the antenna drive servo 18 of FIG. 1.

In operation, the line-of-sight direction cosine error signals 0, $\epsilon_A$ and $-\epsilon_E$ are transformed, as is hereinafter described, into direction cosine error signals $\Delta X_S$, $\Delta Y_S$ and $\Delta Z_S$ referenced to the selected fixed coordinate system. These signals transformed into the fixed coordinate system are then utilized, in conjunction with initial line-of-sight direction cosine signals hereinafter described in greater detail in connection with FIG. 4, to generate the target line-of-sight direction cosine signals $X_S$, $Y_S$ and $Z_S$ relative to the fixed coordinate system. In addition, target line-of-sight direction cosine rate signals $\dot{X}_S$, $\dot{Y}_S$ and $\dot{Z}_S$ are generated by the tracking error computer 50 and may be utilized, together with the line-of-sight direction cosines $X_S$, $Y_S$ and $Z_S$, to compute line-of-sight angular rates as is hereinafter described.

With the system in track mode as illustrated, the relay 54 applies the fixed coordinate system referenced target line-of-sight direction cosine signals $X_S$, $Y_S$ and $Z_S$ to the twist reflector angle error computer 56. With the system in designate mode, the fixed coordinate referenced DESIG direction cosine signals $X_{SD}$, $Y_{SD}$ and $Z_{SD}$ may be applied to the reflector angle error computer 56. The twist reflector angle error computer 56 then transforms these direction cosine values into angular twist reflector pointing error signals $\epsilon_{Ad}$ and $\epsilon_{Ed}$ which are utilized to drive the twist reflector 28 of FIG. 1 through the antenna drive unit 18 in any suitable conventional manner.

The line-of-sight angular rate computer 52 calculates the line-of-sight angular rates $w_{XS}$, $w_{YS}$ and $w_{ZS}$ in the fixed coordinate system in accordance with the following equations:

$$w_{XS} = (Y_S \dot{Z}_S - Z_S \dot{Y}_S)/(X_S^2 + Y_S^2 + Z_S^2) \qquad (6)$$

$$w_{YS} = (Z_S \dot{X}_S - X_S \dot{Z}_S)/(X_S^2 + Y_S^2 + Z_S^2) \qquad (7)$$

$$w_{ZS} = (X_S \dot{Y}_S - Y_S \dot{X}_S)/(X_S^2 + Y_S^2 + Z_S^2) \qquad (8)$$

These calculations may be performed in any suitable conventional manner as, for example, through the use of analog or digital multipliers, adders, subtractors, and dividers. Moreover, the values $X_S$, $Y_S$ and $Z_S$ may be provided in a suitable form to a general purpose or special purpose digital computer programmed to solve the above equations (6), (7) and (8).

Figure 4:
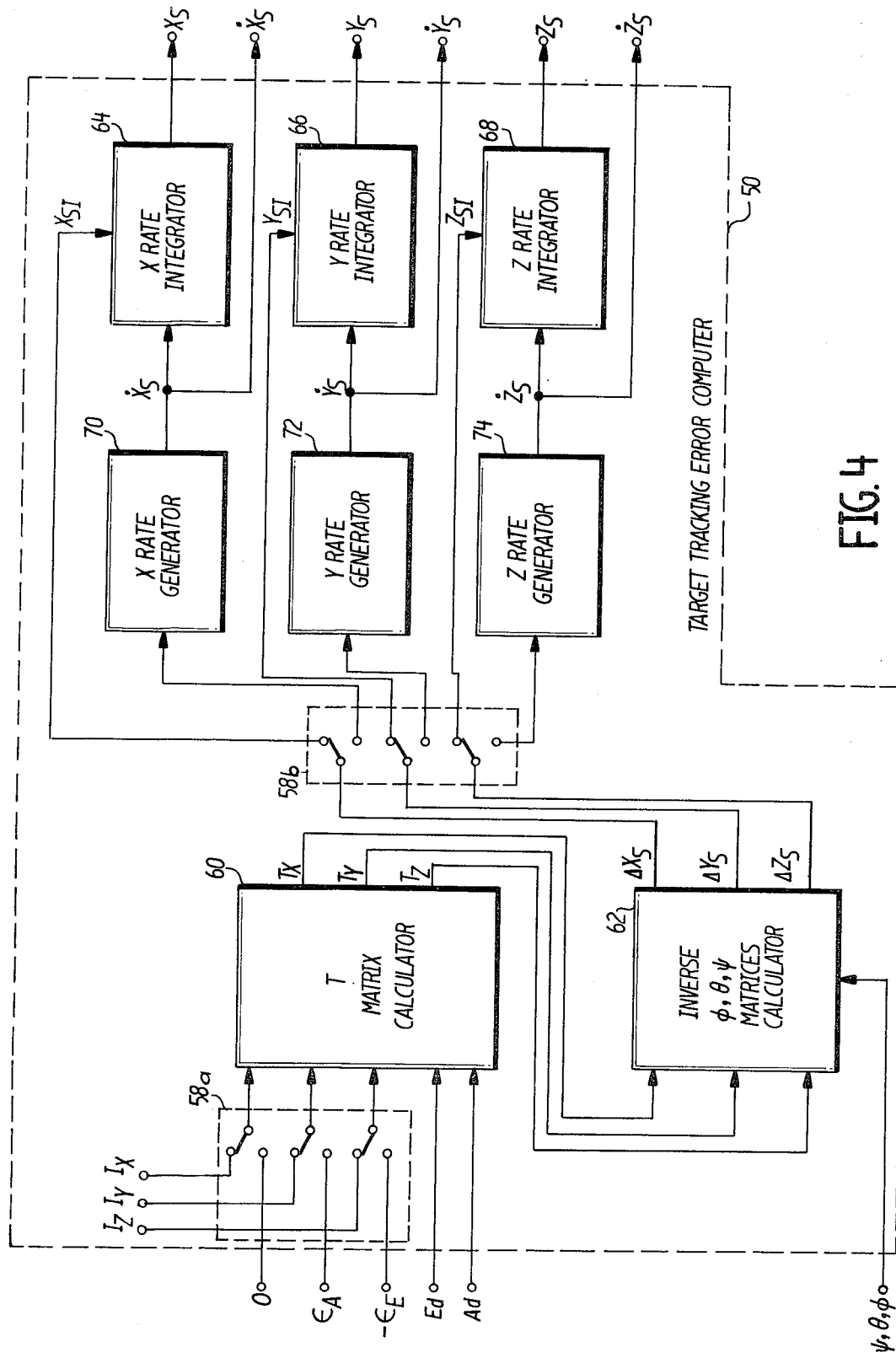
FIG. 4 is a more detailed functional block diagram of the target tracking error computer of FIG. 3.

The target tracking error computer 50 of FIG. 3 is illustrated in greater detail in FIG. 4. Referring now to FIG. 4, the tracking error direction cosine signals 0, $\epsilon_A$ and $-\epsilon_E$ representing the deviations of the unit vector from the line-of-sight axes $X_L$, $Y_L$ and $Z_L$, respectively, may be applied to an initialize/track signal selector 58 such as the relay contacts illustrated in two portions 58$a$ and 58$b$. The initial values $I_X$, $I_Y$ and $I_Z$ of the projections of the unit vector along the respective $X_L$, $Y_L$ and $Z_L$ beam line-of-sight axes, i.e., the quantities 1, 0, 0, respectively, may also be applied to the selector portion 58$a$ and the signals selected by the selector portion 58$a$ may be applied to a T matrix calculator 60.

The T matrix calculator 60 may also be supplied with the twist reflector 28 azimuth and elevation position angles A$d$ and E$d$, respectively, referenced to the reflector gimbal axes. These reflector position angles A$d$ and E$d$ may be utilized, in conjunction with the direction cosine signals selected by the selector 58, to generate either initializing direction cosines $T_{XI}$, $T_{YI}$ and $T_{ZI}$ or direction cosine errors $T_X$, $T_Y$ and $T_Z$ in accordance with the following equations:

$$\begin{bmatrix} T_{XI} \\ T_{YI} \\ T_{ZI} \end{bmatrix} = [T] \begin{bmatrix} I_X \\ I_Y \\ I_Z \end{bmatrix} \qquad (9)$$

$$\begin{bmatrix} T_X \\ T_Y \\ T_Z \end{bmatrix} = [T] \begin{bmatrix} 0 \\ \epsilon_A \\ -\epsilon_E \end{bmatrix} \qquad (10)$$

where [T] is given by equation (5).

Of course, the T matrix calculator may solve the above equations in any suitable conventional manner. For example, a matrix in the form of equation (9) and as used hereinafter may be expanded to obtain the components as follows:

$$\begin{bmatrix} T_{XI} \\ T_{YI} \\ T_{ZI} \end{bmatrix} = \begin{bmatrix} a_{11} & a_{12} & a_{13} \\ a_{21} & a_{22} & a_{23} \\ a_{31} & a_{32} & a_{33} \end{bmatrix} \begin{bmatrix} I_X \\ I_Y \\ I_Z \end{bmatrix} \quad (11)$$

$$T_{XI} = a_{11}I_X + a_{12}I_Y + a_{13}I_Z \quad (12)$$

$$T_{YI} = a_{21}I_X + a_{22}I_Y + a_{23}I_Z \quad (13)$$

$$T_{ZI} = a_{31}I_X + a_{32}I_Y + a_{33}I_Z \quad (14)$$

It is thus apparent that through the use of conventional analog or digital multipliers and adders, the desired output quantities in the form of signals may be obtained from the input quantities in the form of signal utilizing the given $a_{11}$–$a_{33}$ quantities.

The generated $T_X$, $T_Y$ and $T_Z$ signals (or the $T_{XI}$, $T_{YI}$, $T_{ZI}$ signals in initialization mode) from the T matrix calculator 60 may be applied to an inverse $\phi$, $\theta$, $\psi$ matrices calculator 62 together with the aircraft attitude signals $\phi$, $\theta$ and $\psi$. The inverse $\phi$, $\theta$, $\psi$ matrices calculator 62 utilizes these inputs signals to generate the line-of-sight direction cosine error signals $\Delta X_S$, $\Delta Y_S$ and $\Delta Z_S$ in track mode or the stabilized initial direction cosine signals $X_{SI}$, $Y_{SI}$ and $Z_{SI}$ in initialization mode. The output signals $\Delta X_S$, $\Delta Y_S$ and $\Delta Z_X$ and the signals $X_{SI}$, $Y_{SI}$ and $Z_{SI}$ may be generated by the inverse matrices calculator in accordance with the following equations:

$$\begin{bmatrix} \Delta X_S \\ \Delta Y_S \\ \Delta Z_S \end{bmatrix} = [\psi]^{-1} [\theta]^{-1} [\phi]^{-1} \begin{bmatrix} T_X \\ T_Y \\ T_Z \end{bmatrix} \quad (15)$$

$$\begin{bmatrix} X_{SI} \\ Y_{SI} \\ Z_{SI} \end{bmatrix} = [\psi]^{-1} [\theta]^{-1} [\phi]^{-1} \begin{bmatrix} T_{XI} \\ T_{YI} \\ T_{ZI} \end{bmatrix} \quad (16)$$

where the matrices $[\psi]$, $[\theta]$ and $[\phi]$ are given by:

$$[\psi] = \begin{bmatrix} \cos \psi & \sin \psi & 0 \\ -\sin \psi & \cos \psi & 0 \\ 0 & 0 & 1 \end{bmatrix} \quad (17)$$

$$[\theta] = \begin{bmatrix} \cos \theta & 0 & -\sin \theta \\ 0 & 1 & 0 \\ \sin \theta & 0 & \cos \theta \end{bmatrix} \quad (18)$$

$$[\phi] = \begin{bmatrix} 1 & 0 & 0 \\ 0 & \cos \phi & \sin \phi \\ 0 & -\sin \phi & \cos \phi \end{bmatrix} \quad (19)$$

and the inverse of any of the above matrices is obtained by interchanging the rows and columns. For example, the inverse matrix $[\theta]^{-1}$ is given by:

$$[\theta]^{-1} = \begin{bmatrix} \cos \theta & 0 & \sin \theta \\ 0 & 1 & 0 \\ -\sin \theta & 0 & \cos \theta \end{bmatrix} \quad (20)$$

The initialization/track selector portion 58a, illustrated in FIG. 4 in initialization mode, supplies the initialization signals $X_{SI}$, $Y_{SI}$ and $Z_{SI}$ to the respective X rate, Y rate and Z rate integrators 64, 66 and 68, respectively. In track mode, the selector portion 58b supplies the $\Delta X_S$, $\Delta Y_S$ and $\Delta Z_S$ signals to the X rate, Y rate and Z rate generators 70, 72 and 74, respectively. The output signals from the X, Y and Z rate generators 70–74, i.e., the line-of-sight direction cosine rates $\dot{X}_S$, $\dot{Y}_S$, and $\dot{Z}_S$ are applied to the respective X, Y, and Z rate integrators 64–68 and are also provided as output signals from the target tracking error computer 50. The target line-of-sight direction cosine signals $X_S$, $Y_S$ and $Z_S$ from the X, Y, and Z rate integrators 64–68, respectively, are also provided as output signals from the target tracking error computer 50.

In operation, the target tracking error computer is first placed in initialization mode and the selector switch portions 58a and 58b assume the illustrated positions. The initial line-of-sight direction cosine values of $I_X$, $I_Y$ and $I_Z$ (the quantities 1, 0, 0 assuming no tracking errors as was previously described in connection with FIG. 2) are transformed into aircraft axes relates values by the T matrix calculator 60. These initialization values are then transformed by the inverse matrices calculator 62 into initial line-of-sight direction cosines $X_{SI}$, $Y_{SI}$ and $Z_{SI}$ referenced to the selected fixed coordinate system and are then applied to the X, Y, and Z rate integrators to establish the inital values or constants of integration of these integrators.

After the system has been initialized and the initial conditions of the X, Y, and Z rate integrators 64–68 have been set, the selector portion 58a selects the target line-of-sight direction cosine error signals 0, $\epsilon_A$ and $-\epsilon_E$ for application to the T matrix calculator 60. Moreover, the selector portion 58b applies the output signals from the inverse matrices calculator 62 to the X, Y and Z rate generators 70–74.

The target line-of-sight error direction cosine signals 0, $\epsilon_A$ and $-\epsilon_E$ in the line-of-sight coordinate system previously described are transformed into the values $T_X$, $T_Y$ and $T_Z$, respectively, referenced to the aircraft axes system. The aircraft axes referenced values $T_X$, $T_Y$ and $T_Z$ are then referenced to the selected fixed coordinate system by the inverse matrices calculator 62. The resulting line-of-sight direction cosine error signals $\Delta X_S$, $\Delta Y_S$ and $\Delta Z_S$ are thus "stabilized" or referenced to the selected fixed coordinate system.

The "stabilized" line-of-sight direction cosine error signals $\Delta X_S$, $\Delta Y_S$ and $\Delta Z_S$ are applied to the X, Y and Z rate generators 70–74, respectively, resulting in the "stabilized" line-of-sight direction cosine error rates $\dot{X}_S$, $\dot{Y}_S$ and $\dot{Z}_S$. The generation of the error rates $\dot{X}_S$, $\dot{Y}_S$ and $\dot{Z}_S$ is accomplished by modifying each of the error signals $\Delta X_S$, $\Delta Y_S$ and $\Delta Z_S$ in accordance with a rate memory transfer function R and this modification may be expressed in terms of the La Place operator S as follows:

$$\dot{X}_S(S) = [R(S)] [\Delta X_S(S)] \quad (21)$$

$$\dot{Y}_S(S) = [R(S)] [\Delta Y_S(S)] \quad (22)$$

$$\dot{Z}_S(S) = [R(S)] [\Delta Z_S(S)] \quad (23)$$

where:

$$R(S) = Ka(S/\tau_1 + 1S(S/\tau_2 + 1) \quad (24)$$

where:

Ka is a transfer constant and $\tau_1$ and $\tau_2$ are reciprocals of the circuit time constants which modify the frequency response of the tracking system.

These error rates are integrated by the X, Y and Z rate integrators 64–68, respectively, to provide the respective "stabilized" line-of-sight direction cosine signals $X_S$, $Y_S$ and $Z_S$. The transfer function of each of the integrators 64, 66 and 68 may be expressed as a function of the La Place operator S as 1/S. The initial conditions, when the 1/S transfer function is expressed as a function of time, are supplied as was previously described by the $X_{SI}$, $Y_{SI}$ and $Z_{SI}$ signals. The signals $X_S$, $Y_S$ and $Z_S$ thus define, in the fixed coordinate system, the orientation of a unit vector directed along the line-of-sight to the target, i.e., the signals $X_S$, $Y_S$ and $Z_S$ define the stabilized line-of-sight to the target in direction cosines.

Figure 5:
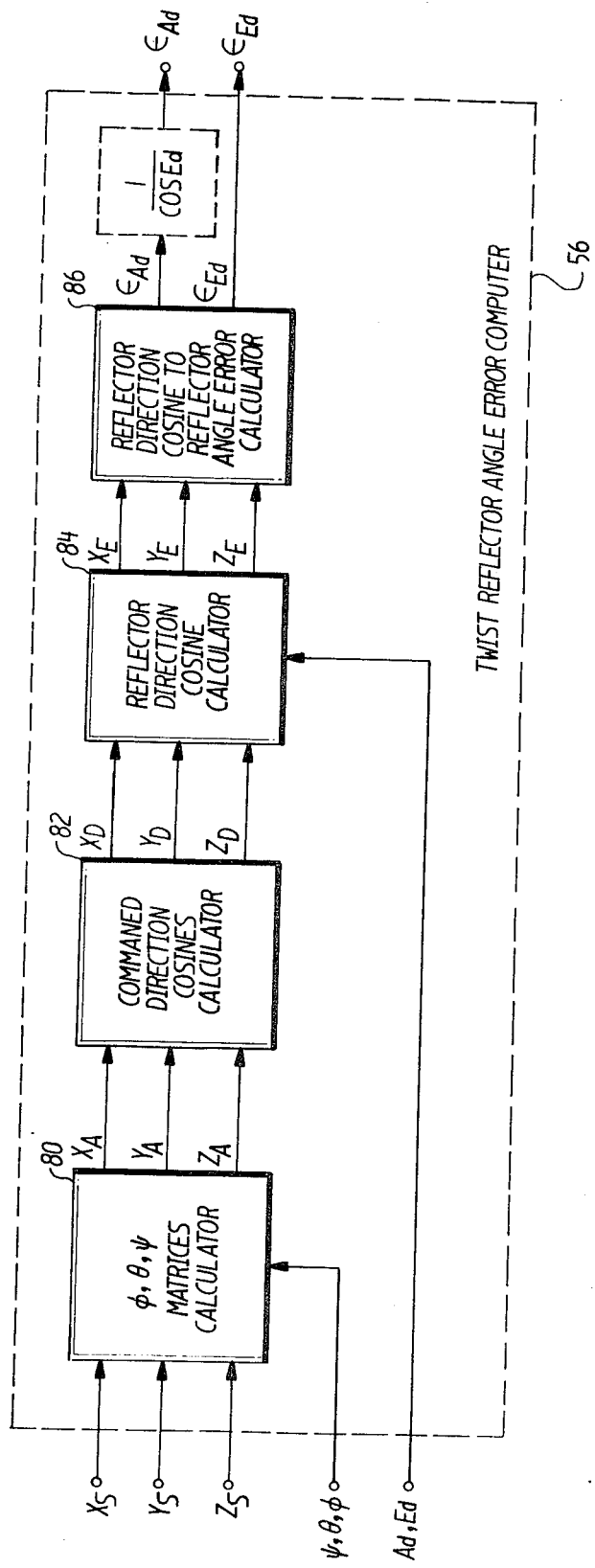
FIG. 5 is a more detailed functional block diagram of the twist reflector angle error computer of FIG. 3.

The twist reflector angle error computer 56 of FIG. 3 is illustrated in greater detail in FIG. 5. Referring now to FIG. 5, the "stabilized" direction cosine signals selected by the track/designator relay 54 of FIG. 3 are applied to a $\phi$, $\theta$, $\psi$ matrices calculator 80 in the twist reflector angle error computer 56. In track mode, these signals apply to the matrices calculator 80 comprise the line-of-sight direction cosine signals $X_S$, $Y_S$ and $Z_S$ generator by the target tracking error computer 50 of FIG. 3. In designate mode, the signals applied to the matrices calculator 80 may comprise the signals $X_{SD}$, $Y_{SD}$ and $Z_{SD}$ which may represent a search pattern or a particular set of "stabilized" line-of-sight direction cosine signals designating a particular target location.

The aircraft angular attitude signals $\psi$, $\theta$ and $\phi$ from the aircraft attitude signal generator 20 of FIG. 1 may also be applied to the matrices calculator 80 and the output signals $X_A$, $Y_A$ and $Z_A$ from the matrices calculator may be applied to a reflector commanded direction cosine calculator 82. The reflector commanded direction cosine calculator 82 generates commanded direction cosine signals $X_D$, $Y_D$ and $Z_D$ referenced to the aircraft axes and these signals may be applied to a reflector direction cosine calculator 84 together with the reflector angular position signals A$d$ and E$d$ from the reflector drive unit 18 of FIG. 1.

The reflector direction cosine calculator 84 transforms the commanded reflector direction cosines $X_D$, $Y_D$ and $Z_D$ into reflector direction cosines $X_E$, $Y_E$ and $Z_E$ referenced to the reflector axes. The reflector direction cosine signal $X_E$, $Y_E$ and $Z_E$ are then applied to a reflector direction cosine to reflector angle error calculator 86 and there transformed into reflector angle error signals $\epsilon_{Ad}$ and $\epsilon_{Ed}$. The signals $\epsilon_{Ad}$ and $\epsilon_{Ed}$ may be provided as output signals of the twist reflector angle error computer 56 for use by the antenna drive unit 18 of FIG. 1 in positioning the reflector 28. Moreover, to account for the effect of large elevation angles on the azimuth servo loop, the reflector azimuth angle error $\epsilon_{Ad}$ may be divided by the cosine of the reflector elevation angle E$d$ as is illustrated in phantom. Thus, the overall azimuth loop gain remains essentially constant irrespective of elevation angle.

In operation, the tracking or designation "stabilized" line-of-sight direction cosine signals $X_S$, $Y_S$ and $Z_S$ applied to the matrices calculator 80 are transformed into line-of-sight direction cosines $X_A$, $Y_A$ and $Z_A$ referenced to the aircraft axes. This transformation may be accomplished in any suitable conventional manner, as was previously described, utilizing the $\psi$, $\theta$ and $\phi$ matrices of equations (17), (18) and (19). This transformation may be expressed as follows:

$$\begin{bmatrix} X_A \\ Y_A \\ Z_A \end{bmatrix} = [\phi][\theta][\psi] \begin{bmatrix} X_S \\ Y_S \\ Z_S \end{bmatrix} \quad (25)$$

The aircraft axes referenced direction cosines $X_A$, $Y_A$ and $Z_A$ may then be utilized to generate the direction cosine signals $X_D$, $Y_D$ and $Z_D$ in the reflector commanded direction cosine calculator 82 through the use of the following equations:

$$X_D = \sqrt{(1 + Xa)/2} \quad (26)$$

$$Y_D = Ya/2X_D \quad (27)$$

$$Z_D = Za/2X_D \quad (28)$$

The commanded reflector direction cosines $X_D$, $Y_D$ and $Z_D$ referenced to the aircraft axes must then be transformed into reflector direction cosines $X_E$, $Y_E$ and $Z_E$ referenced to the reflector axes. This may be accomplished in the reflector direction cosine calculator 84 in accordance with the following transform equations:

$$\begin{bmatrix} X_E \\ Y_E \\ Z_E \end{bmatrix} = [Ed][Ad] \begin{bmatrix} X_D \\ Y_D \\ Z_D \end{bmatrix} \quad (29)$$

where:

$$[Ad] = \begin{bmatrix} \cos Ad & \sin Ad & 0 \\ -\sin Ad & \cos Ad & 0 \\ 0 & 0 & 1 \end{bmatrix} \quad (30)$$

$$[Ed] = \begin{bmatrix} \cos Ed & 0 & -\sin Ed \\ 0 & 1 & 0 \\ \sin Ed & 0 & \cos Ed \end{bmatrix} \quad (31)$$

Having obtained the direction cosines of the reflector referenced to the reflector axes, angular reflector position error signals $\epsilon_{Ad}$ and $\epsilon_{Ed}$ in azimuth and elevation, respectively, may be generated by the reflector direction cosine to reflector angle error calculator 86. The direction cosine signals $X_E$, $Y_E$ and $Z_E$ will, of course, be equal to 1, 0, 0 if the commanded reflector position is the same as the present reflector position as indicated by the reflector direction cosine calculator 84. All other relationships between the present reflector position and the commanded reflector position show up in azimuth and elevation as values of $Y_E$ and $Z_E$ other than zero. Thus, the azimuth pointing error of the reflector is approximately equal to the value of $Y_E$ for small error angles. Likewise, the reflector elevation pointing error signal $\epsilon_{Ed}$ is approximately equal to the value $-Z_E$ for small pointing errors. A more exact mathematical relationship between $X_E$, $Y_E$, $Z_E$ and $\epsilon_{Ad}$, $\epsilon_{Ed}$ exists, however, and may be utilized in the reflector direction cosine to reflector angle error calculator 86 to provide the error signals $\epsilon_{Ad}$ and $\epsilon_{Ed}$. These relationships are:

$$\epsilon_{Ad} = \tan^{-1}(Y_E/X_E) \approx Y_E \quad (32)$$

$$\epsilon_{Ed} = \sin^{-1} -Z_E \sqrt{X_E^2 + Y_E^2 + Z_E^2} \approx -Z_E \quad (33)$$

Figure 6:
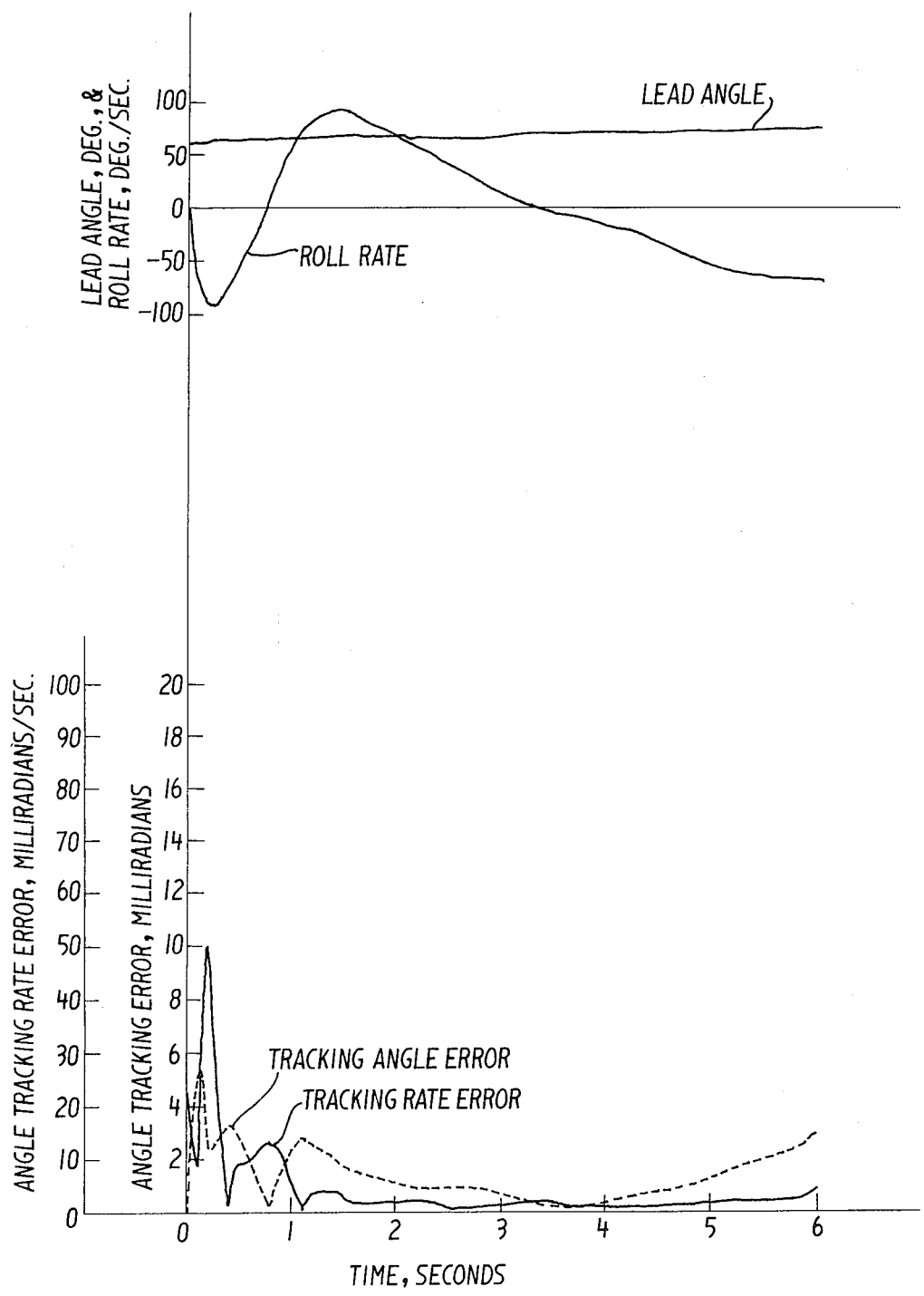
FIG. 6 is a graph illustrating simulated response characteristics of a conventional radar antenna positioning system employing rate gyros.
Figure 7:
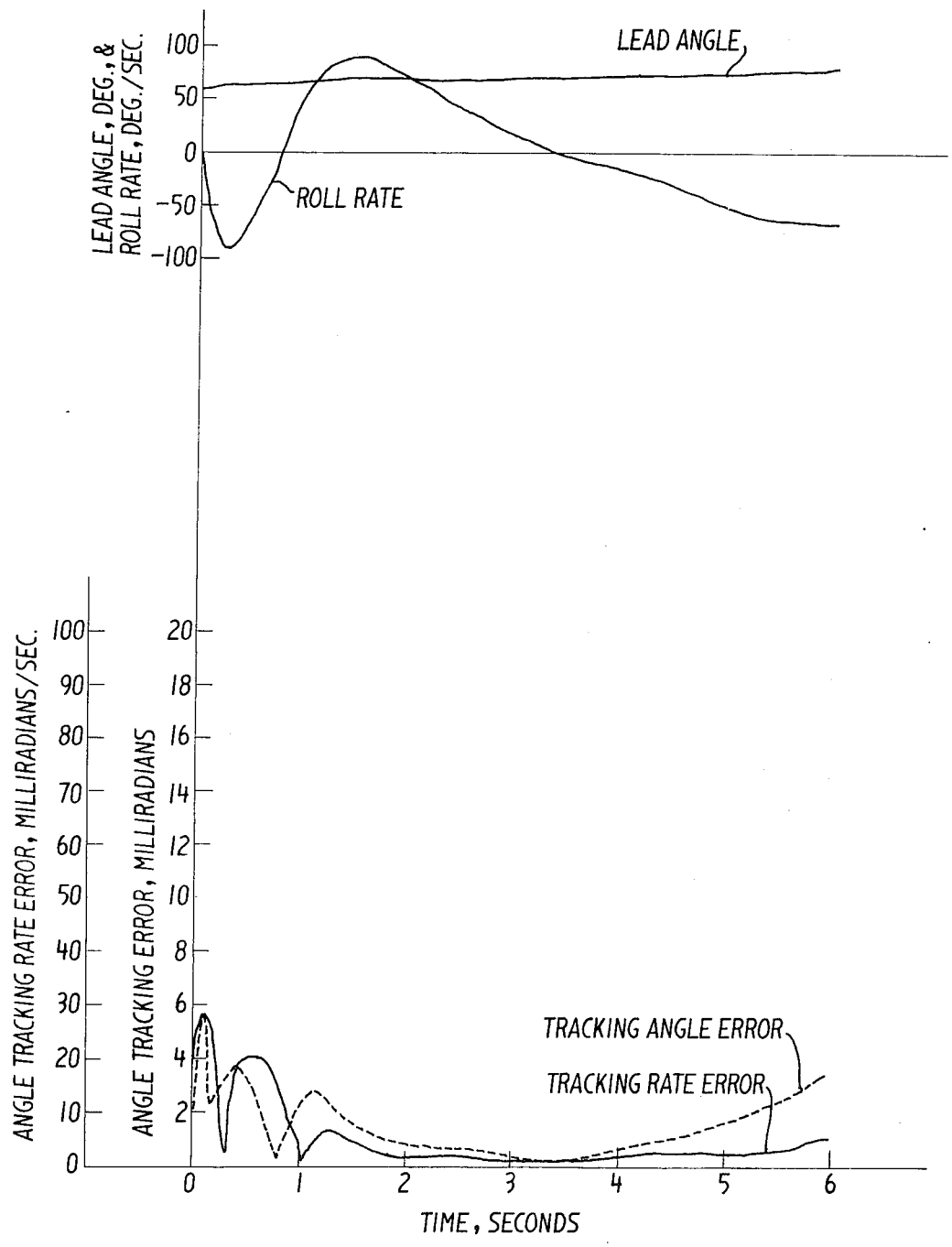
FIG. 7 is a graph illustrating simulated response characteristics of the positioning system of the present invention implemented with analog techniques.

FIGS. 6 and 7 graphically illustrate the respective simulated response characteristics of a conventional system employing rate gyros and an analog implementation of the system of the present invention. It can be seen that in each simulation that identical aircraft lead angles and roll rates were chosen for each simulation and that the resulting angle tracking characteristics with respect to time are substantially identical.

Moreover, it should be noted that the lead angle in each simulation was chosen such that the target line-of-sight rate was very small. Under these conditions the characteristics illustrated in FIGS. 6 and 7 look alike. However, it was found that under more adverse conditions, the tracking characteristics of the invention were clearly better than those of the rate gyro system.

It is thus apparent that the system performs tracking functions approximating those of systems employing rate gyros and, under extremely adverse conditions, actually out performs the conventional rate gyro system. The need for rate gyros in the tracking loop is eliminated and considerable weight and space savings are effected.

While the present invention has been described in connection with a radar system employing a cassegrain antenna, it should be be noted that the system of the invention may also be employed in connection with radar systems utilizing "non-cassegrain" antenna systems, i.e., antenna systems wherein beam position is directly related to the position of the antenna. For such a use, the derotation function C of the [T] matrix need not be utilized and the quantities $\lambda_a$ and $\lambda_e$, i.e., beam position angles in aircraft coordinates, employed throughout the system in lieu of the angles E$d$ and A$d$ employed in solving the cassegrain antenna problem. Moreover, the command direction cosine calculator 82 need not be provided since $X_D$, $Y_D$ and $Z_D$ are equal, respectively, to $X_A$, $Y_A$ and $Z_A$ in the "non-cassegrain" systems.

Thus, employing the system of the present invention in a "non-cassegrain" antenna system eliminates the need for rate gyros and provides greater capabilities than systems employing rate gyros. For example, the present invention virtually eliminates large tracking lags which occur in systems using rate gyros in the tracking loop when, for example, high aircraft roll values are encountered.

It should further be noted that the system of the invention, although described utilizing direction cosines for the angular calculations, may employ any convenient angular system. Direction cosines are, however, particularly advantageous since certain poles which cause problems in a system wherein positions are defined by two angles are eliminated through the use of direction cosines.

The present invention may thus be embodied in other specific forms without departing from the spirit or essential characteristics thereof. For example, the calculations required for the operation of the system as disclosed above may be performed by any suitable conventional general purpose digital computer when suitably programmed. The entire system may, in addition, be implemented digitally by the method and apparatus disclosed and claimed in the copending United States application of Heller et al assigned to the assignee hereof and filed concurrently herewith. The presently disclosed embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. Apparatus for positioning a radar system antenna comprising:
    means for generating an initialization signal representing a radar beam line-of-sight relative to a predetermined beam line-of-sight axis system;
    means for generating an error signal representing an angular error between the radar beam line-of-sight and a target line-of-sight referenced to said predetermined beam line-of-sight axis system;
    means for referencing said error signal and said initialization signal to a predetermined fixed coordinate system;
    means responsive to the fixed coordinate system referenced initialization and error signals for generating a line-of-sight position signal representing the angular position of the target line-of-sight relative to said fixed coordinate system; and,
    means responsive to said line-of-sight position signal and to antenna position signals for driving the antenna in a direction tending to null said generated error signal.

2. The apparatus of claim 1 wherein said antenna includes a reflector driven by said antenna driving means, said referencing means including means for compensating said error signal for the rotational effect on the radar beam introduced by the driving of said antenna in azimuth.

3. The apparatus of claim 2 wherein said beam line-of-sight axis system comprises a set of axes referenced to the radar beam; and, wherein said referencing means includes:
    means for referencing said beam line-of-sight referenced error signal to an aircraft axis system, and means for referencing said aircraft axis system referenced error signal to said fixed coordinate system.

4. The apparatus of claim 2 wherein said means for generating a line-of-sight position signal comprises:
   means responsive to said fixed coordinate system referenced error signal for generating an error rate signal representing the error rate of the target line-of-sight; and,
   means responsive to said error rate signal and to said fixed coordinate system referenced initialization signal for generating said line-of-sight position signal.

5. The apparatus of claim 4 wherein said antenna driving means includes:
   means responsive to said line-of-sight position signal for generating a reflector angular position error signal referenced to said reflector axes; and,
   means responsive to said reflector angular position error signal for driving said reflector in a direction tending to null said line-of-sight error signal.

6. The apparatus of claim 1 wherein said means for generating a line-of-sight position signal comprises:
   means responsive to said fixed coordinate system referenced error signal for generating an error rate signal representing the error rate of the target line-of-sight; and,
   means responsive to said error rate signal and to said fixed coordinate system referenced initialization signal for generating said line-of-sight position signal.

7. The apparatus of claim 6 wherein said driving means includes:
   means responsive to said line-of-sight position signal for generating an antenna angular position error signal referenced to a predetermined set of antenna axes; and,
   means responsive to said antenna angular position error signal for driving said antenna in a direction tending to null said line-of-sight error signal.

8. The apparatus of claim 6 wherein said means for generating said error rate signal comprises means for modifying said fixed coordinate referenced signal in accordance with the transfer function $$Ka \, (S/\tau_1 + 1)/Sa \, (S/\tau_2 + 1)$$

where Ka is a constant and $\tau_1$ and $\tau_2$ are reciprocals of the time constants, the values of Ka, $\tau_1$ and $\tau_2$ being selected according to a desired system frequency response.

9. The apparatus of claim 8 wherein said means for generating said line-of-sight position signal comprises means for integrating said error rate signal using said fixed coordinate system referenced initialization signal as a constant of integration.

10. The apparatus of claim 1 wherein said beam line-of-sight axis system corresponds to a predetermined antenna axis system whereby said generated error signal is referenced to said antenna axis system, said referencing means being operable to transform said error and initialization signals from said antenna axis system to said fixed coordinate system.

11. The apparatus of claim 10 wherein the generated error signal is referenced to the fixed coordinate system in accordance with the matrix transform $$\begin{bmatrix} \Delta X_S \\ \Delta Y_S \\ \Delta Z_S \end{bmatrix} = [\psi]^{-1}[\theta]^{-1}[\phi]^{-1}[\lambda a]^{-1}[\lambda e]^{-1} \begin{bmatrix} 0 \\ \epsilon_A \\ -\epsilon_E \end{bmatrix}$$

where $\Delta X_S$, $\Delta Y_S$ and $\Delta Z_S$ represent the fixed coordinate system referenced error signals, $[\psi]^{-1}[\theta]^{-1}$ and $[\phi]^{-1}$ represent the inverse matrices of aircraft azimuth, elevation and roll, respectively, $[\lambda a]^{-1}$ and $[\lambda e]^{-1}$ represent the inverse matrices of beam line-of-sight azimuth and elevation positions, respecitvely, and 0, $\epsilon_A$ and $-\epsilon_E$ represent the direction cosines of a target line-of-sight vector.

12. The apparatus of claim 11 wherein the initialization signal is referenced to the fixed coordinate system in accordance with the matrix transform $$\begin{bmatrix} \Delta X_S \\ \Delta Y_S \\ \Delta Z_S \end{bmatrix} = [\psi]^{-1}[\theta]^{-1}[\phi]^{-1}[\lambda a]^{-1}[\lambda e]^{-1} \begin{bmatrix} I_X \\ I_Y \\ I_Z \end{bmatrix}$$

where $\Delta X_S$, $\Delta Y_S$ and $\Delta Z_S$ represent the fixed coordinate system referenced error signals, $[\psi]^{-1}[\theta]^{-1}$ and $[\phi]^{-1}$ represent the inverse matrices of aircraft azimuth, elevation and roll, respectively, $[\lambda a]^{-1}$ and $[\lambda e]^{-1}$ represent the inverse matrices of beam line-of-sight azimuth and elevation positions, respectively, and $I_X$, $I_Y$ and $I_Z$ represent the initial direction cosines of beam line-of-sight in said beam line-of-sight axis system.

13. The apparatus of claim 1 including a beam reflector means having a predetermined reflector axis system differing from the beam line-of-sight axis system for substantially all reflector positions; and,
   wherein said reflector driving means is responsive to said line-of-sight position signal and reflector position signals for driving said reflector in a direction tending to null said error signal.

14. The apparatus of claim 13 wherein the generated error signal is referenced to the fixed coordinate system in accordance with with the matrix transform $$\begin{bmatrix} \Delta X_S \\ \Delta Y_S \\ \Delta Z_S \end{bmatrix} = [\psi]^{-1}[\theta]^{-1}[\phi]^{-1}[T] \begin{bmatrix} 0 \\ \epsilon_A \\ -\epsilon_E \end{bmatrix}$$

where $\Delta X_S$, $\Delta Y_S$ and $\Delta Z_S$ represent the fixed coordinate system referenced error signals, $[\psi]^{-1}[\theta]^{-1}$ and $[\phi]^{-1}$ represent the inverse matrices of aircraft azimuth, elevation and roll, respectively, and 0, $\epsilon_A$, and $-\epsilon_E$ represent the direction cosines of a target line-of-sight vector, and where $$[T] = \begin{bmatrix} (2\cos^2 A_d \cos^2 E_d - 1) & -(\cos^2 E_d \sin 2A_d) & (\cos A_d \sin 2E_d) \\ (\cos^2 E_d \sin 2A_d) & -(2\cos^2 E_d \sin^2 A_d - 1) & (\sin A_d \sin 2E_d) \\ (-\cos A_d \sin 2E_d) & (\sin A_d \sin 2E_d) & (\cos 2E_d) \end{bmatrix}$$

15. The apparatus of claim 14 wherein the initialization signal is referenced to the fixed coordinate system in accordance with the matrix transform $$\begin{bmatrix} \Delta X_S \\ \Delta Y_S \\ \Delta Z_S \end{bmatrix} = [\psi]^{-1}[\theta]^{-1}[\phi]^{-1}[T] \begin{bmatrix} I_X \\ I_Y \\ I_Z \end{bmatrix}$$

where $\Delta X_S$, $\Delta Y_S$ and $\Delta Z_S$ represent the fixed coordinate system referenced error signals, $[\psi]^{-1}[\theta]^{-1}$ and $[\phi]^{-1}$ represent the inverse matrices of aircraft azimuth, elevation and roll, respectively, and $I_X$, $I_Y$ and $I_Z$ represent the initial direction cosines of beam line-of-sight in said beam line-of-sight axis system, and where $$[T] = \begin{bmatrix} (2\cos^2 A_d \cos^2 E_d - 1) & -(\cos^2 E_d \sin 2A_d) & (\cos A_d \sin 2E_d) \\ (\cos^2 E_d \sin 2A_d) & -(2\cos^2 E_d \sin^2 A_d - 1) & (\sin A_d \sin 2E_d) \\ (-\cos A_d \sin 2E_d) & (\sin A_d \sin 2E_d) & (\cos 2E_d) \end{bmatrix}$$

16. Apparatus for driving the reflector of a cassegrain radar antenna in response to sensed tracking error signal referenced to beam line-of-sight to thereby minimize the tracking error between beam line-of-sight and target line-of-sight comprising:

means for referencing a sensed tracking error signal referenced to beam line-of-sight to a predetermined fixed coordinate system, said tracking error signal referencing means including means for modifying the tracking error signal in accordance with a predetermined transformation function including a beam derotation function;

means for modifying the tracking error signal when referenced to a fixed coordinate system in accordance with a predetermined transfer function to generate a tracking error rate signal referenced to a fixed coordinate system;

means for integrating the tracking error rate signal when referenced to a fixed coordinate system including means for supplying to said integrating means fixed coordinate system referenced initial condition signals representing a condition of zero tracking error, the integrated tracking error rate signal thereby representing the position of the line-of-sight to the target in the fixed coordinate system; and, means responsive to said line-of-sight position signal and to antenna position signals for driving the antenna in a direction tending to null said tracking error signal.

17. The apparatus of claim 16 wherein the generated error signal is referenced to the fixed coordinate system in accordance with with the matrix transform $$\begin{bmatrix} \Delta X_S \\ \Delta Y_S \\ \Delta Z_S \end{bmatrix} = [\Psi]^{-1}[\theta]^{-1}[\phi]^{-1}]T] \begin{bmatrix} 0 \\ -\epsilon_A \\ -\epsilon_E \end{bmatrix}$$

where $\Delta X_S$, $\Delta Y_S$ and $\Delta Z_S$ represent the fixed coordinate system referenced error signals, $[\psi]^{-1}[\theta]^{-1}$ and $[\phi]^{-1}$ represent the inverse matrices of aircraft azimuth, elevation and roll, respectively, and 0, $\epsilon_A$, and $-\epsilon_E$ represent the direction cosines of a target line-of-sight vector, and where $$|T| = \begin{bmatrix} (2\cos^2 A_d \cos^2 E_d - 1) & -(\cos^2 E_d \sin 2A_d) & (\cos A_d \sin 2E_d) \\ (\cos^2 E_d \sin 2A_d) & -(2\cos^2 E_d \sin^2 A_d - 1) & (\sin A_d \sin 2E_d) \\ (-\cos A_d \sin 2E_d) & (\sin A_d \sin 2E_d) & (\cos 2E_d) \end{bmatrix}$$

18. The apparatus of claim 17 wherein the tracking error signal referenced to the fixed coordinate system is modified by the transfer function:

$$Ka\,(S/\tau_1 + 1)/S\,(S/\tau_2 + 1)$$

where S is the La Place operator and $Ka$, $\tau_1$ and $\tau_2$ are constants which determine system frequency response.

19. The apparatus of claim 18 wherein the target line-of-sight position is expressed as direction cosines $X_S$ and $Z_S$ and wherein the direction cosines are referenced to the aircraft axes by the transform:

$$\begin{bmatrix} X_A \\ Y_A \\ Z_A \end{bmatrix} = [\phi][\theta][\psi] \begin{bmatrix} X_S \\ Y_S \\ Z_S \end{bmatrix}$$

where $$[\psi] = \begin{bmatrix} \cos\psi & \sin\psi & 0 \\ -\sin\psi & \cos\psi & 0 \\ 0 & 0 & 1 \end{bmatrix}$$

where $$[\theta] = \begin{bmatrix} \cos\theta & 0 & -\sin\theta \\ 0 & 1 & 0 \\ \sin\theta & 0 & \cos\theta \end{bmatrix}$$

where $$[\phi] = \begin{bmatrix} 1 & 0 & 0 \\ 0 & \cos\phi & \sin\phi \\ 0 & -\sin\phi & \cos\phi \end{bmatrix}$$

and

20. The apparatus of claim 19 wherein reflector commanded cosines $X_D$, $Y_D$, and $Z_D$ are generated in response to the aircraft axes referenced line-of-sight direction cosines $X_A$, $Y_A$, and $Z_A$ by the following equations:

$$X_D = [(1 + Xa)/2]^{1/2};$$

$$Y_D = Ya/2X_D;\text{ and,}$$

$$Z_D = Za/2X_D.$$

21. The apparatus of claim 20 wherein said commanded direction cosines are referenced to the reflector axes by the transform:

$$\begin{bmatrix} X_E \\ Y_E \\ Z_E \end{bmatrix} = [Ed][Ad] \begin{bmatrix} X_D \\ Y_D \\ Z_D \end{bmatrix}$$

where $$[Ed] = \begin{bmatrix} \cos Ed & 0 & -\sin Ed \\ 0 & 1 & 0 \\ \sin Ed & 0 & \cos Ed \end{bmatrix};$$

and $$[Ad] = \begin{bmatrix} \cos Ad & \sin Ad & 0 \\ -\sin Ad & \cos Ad & 0 \\ 0 & 0 & 1 \end{bmatrix}.$$

22. The apparatus of claim 21 wherein reflector angular position error signals in azimuth and elevation in $\epsilon_{Ad}$ and $\epsilon_{Ed}$, respectively, are generated by the equations:

$$\epsilon_{Ad} = \tan^{-1}(Y_E/X_E) = Y_E; \text{ and,}$$

$$\epsilon Ed = \sin^{-1}\left[\frac{-Z_E}{(X_E^2 + Y_E^2 + Z_E^2)^{1/2}}\right] = Z_E.$$

23. The apparatus of claim 16 wherein the tracking error signal referenced to the fixed coordinate system is modified by the transfer function:

$$Ka\ (S/\tau_1 + 1)/S\ (S\tau_2 + 1)$$

where S is the La Place operator and Ka, $\tau_1$ and $\tau_2$ are constants which determine system frequency response.

24. The apparatus of claim 16 wherein the generated error signal is referenced to the fixed coordinate system in accordance with the matrix transform $$\begin{bmatrix} \Delta X_S \\ \Delta Y_S \\ \Delta Z_S \end{bmatrix} = [\psi]^{-1}[\theta]^{-1}[\phi]^{-1}[\lambda a]^{-1}[\lambda e]^{-1} \begin{bmatrix} 0 \\ \epsilon_A \\ -\epsilon_E \end{bmatrix}$$

where $\Delta X_S$, $\Delta Y_S$ and $\Delta Z_S$ represent the fixed coordinate system referenced error signals, $[\psi]^{-1}[\theta]^{-1}$ and $[\phi]^{-1}$ represent the inverse matrices of aircraft azimuth, elevation and roll, respectively, $[\lambda a]^{-1}$ and $[\lambda e]^{-1}$ represent the inverse matrices of beam line-of-sight azimuth and elevation positions, respecitvely, and 0, $\epsilon_A$ and $-\epsilon_E$ represent the direction cosines of a target line-of-sight vector.

25. The apparatus of claim 24 wherein the tracking error signal referenced to the fixed coordinate system is modifed by the transfer function:

$$Ka\ (S/\tau_1 + 1)/S\ (S/\tau_2 + 1)$$

where S is the La Place operator and Ka, $\tau_1$ and $\tau_2$ are constants which determine system frequency response.

26. The apparatus of claim 25 wherein the target line-of-sight position is expressed as direction cosines $X_S$ and $Z_S$ and wherein the direction cosines are referenced to the aircraft axes by the transform:

$$\begin{bmatrix} X_A \\ Y_A \\ Z_A \end{bmatrix} = [\phi][\theta][\psi] \begin{bmatrix} X_S \\ Y_S \\ Z_S \end{bmatrix}$$

where $$[\psi] = \begin{bmatrix} \cos\psi & \sin\psi & 0 \\ -\sin\psi & \cos\psi & 0 \\ 0 & 0 & 1 \end{bmatrix}$$

where $$[\theta] = \begin{bmatrix} \cos\theta & 0 & -\sin\theta \\ 0 & 1 & 0 \\ \sin\theta & 0 & \cos\theta \end{bmatrix}$$

where $$[\phi] = \begin{bmatrix} 1 & 0 & 0 \\ 0 & \cos\phi & \sin\phi \\ 0 & -\sin\phi & \cos\phi \end{bmatrix}.$$

and

27. The apparatus of claim 16 wherein antenna commanded direction cosines $X_D$, $Y_D$ and $Z_D$ are generated in response to the aircraft axes referenced line-of-sight direction cosines $X_A$, $Y_A$, and $Z_A$ by the following equations:

$$X_D = [(1 + X_a)/2]^{1/2};$$

$$Y_D = Y_a/2X_D; \text{ and,}$$

$$Z_D = Z_a/2X_D.$$

28. The apparatus of claim 27 wherein antenna angular position error signals in azimuth and elevation in $\epsilon_{Ad}$ and $\epsilon_{Ed}$, respectively, are generated by the equations:

$$\epsilon_{Ad} = \tan^{-1}(Y_E/X_E) \approx Y_E\ ; \text{ and,}$$

$$\epsilon Ed = \sin^{-1}\left[\frac{-Z_E}{(X_E^2 + Y_E^2 + Z_E^2)^{1/2}}\right] \approx -Z_E,$$

where $X_E$, $Y_E$ and $Z_E$ are commanded antenna direction cosines referenced to the antenna axis system.

29. A method of positioning a radar system antenna comprising the steps of:
  a. generating an initialization signal representing a radar beam line-of-sight relative to a predetermined beam line-of-sight axis system;
  b. generating an error signal representing an angular error between the radar beam line-of-sight and a target line-of-sight referenced to the predetermined beam line-of-sight axis system;
  c. referencing said error signal and the initialization signal to a predetermined fixed coordinate system;
  d. generating in response to the fixed concentric system referenced initialization and error signals a line-of-sight position signal representing the angular position of the target line-of-sight relative to the fixed coordinate system; and,
  e. generating antenna position signals; and,
  f. driving the antenna in response to the line-of-sight position signal and antenna position signals in a direction tending to null the generated error signal.

30. The method of claim 29 wherein the antenna includes a reflector and including the step of compensating the error signal for the rotational effect on the radar beam resulting from the driving of the antenna.

31. The method of claim 30 wherein the beam line-of-sight axis system comprises a set of axes referenced to the radar beam and including the steps of:
referencing the beam line-of-sight referenced error signal to an aircraft axis system; and,
referencing the aircraft axes referenced error signal to the fixed coordinate system.

32. The method of claim 31 wherein the line-of-sight position signal is generated by the steps of:
generating in response to the fixed coordinate system referenced error signal an error rate signal representing the error rate of the target line-of-sight; and,
generating the line-of-sight position signal in response to the error rate signal and the fixed coordinate system referenced intialization signal.

33. The method of claim 32 wherein said antenna is driven by the steps of:
generating in response to the line-of-sight position signal a reflector angular position error signal referenced to the reflector axes; and,
driving the reflector responsively to the reflector angular position error signal in a direction tending to null the line-of-sight error signal.

34. The method of claim 29 wherein the line-of-sight position signal is generated by the steps of:
generating in response to the fixed coordinate system referenced error signal an error rate signal representing the error rate of the target line-of-sight; and,
generating the line-of-sight position signal in response to the error rate signal and the fixed coordinate system referenced initialization signal.

35. The method of claim 34 wherein the driving of the antenna includes the steps of:
generating in response to the line-of-sight position signal an antenna angular position error signal referenced to a predetermined set of antenna axes; and,
driving the antenna in response to the antenna angular position error signal in a direction tending to null the line-of-sight error signal.

36. The method of claim 34 wherein the error rate signal is generated by modifying the fixed coordinate referenced signal in accordance with the transfer function $$Ka\,(S/\tau_1 + 1)/Sa\,(S/\tau_2 + 1)$$

where $Ka$ is a constant and $\tau_1$ and $\tau_2$ are reciprocals of the time constants, the values of $Ka$, $\tau_1$ and $\tau_2$ being selected according to a desired system frequency response.

37. The method of claim 36 wherein the line-of-sight position signal is generated by integrating the error rate signal using the fixed coordinate system referenced initialization signal as a constant of integration.

$$[T] = \begin{bmatrix} (2\cos^2 A_d \cos^2 E_d - 1) & -(\cos^2 E_d \sin 2A_d) & (\cos A_d \sin 2E_d) \\ (\cos^2 E_d \sin 2A_d) & -(2\cos^2 E_d \sin^2 A_d - 1) & (\sin A_d \sin 2E_d) \\ (-\cos A_d \sin 2E_d) & (\sin A_d \sin 2E_d) & (\cos 2E_d) \end{bmatrix}$$

38. The method of claim 29 wherein the beam line-of-sight axis system corresponds to a predetermined antenna axis system whereby the generated error signal is referenced to the antenna axis system, the error and initialization signals referenced to the antenna axis system being referenced to the fixed coordinate system.

39. The method of claim 38 wherein the generated error signal is referenced to the fixed coordinate system in accordance with the matrix transform $$\begin{bmatrix} \Delta X_S \\ \Delta Y_S \\ \Delta Z_S \end{bmatrix} = [\psi]^{-1}[\theta]^{-1}[\phi]^{-1}[\lambda a]^{-1}[\lambda e]^{-1} \begin{bmatrix} 0 \\ \epsilon_A \\ -\epsilon_E \end{bmatrix}$$

where $\Delta X_S$, $\Delta Y_S$ and $\Delta Z_S$ represent the fixed coordinate system referenced error signals, $[\psi]^{-1}[\theta]^{-1}$ and $[\phi]^{-1}$ represent the inverse matrices of aircraft azimuth, elevation and roll, respectively, $[\lambda a]^{-1}$ and $[\lambda e]^{-1}$ represent the inverse matrices of beam light-of-sight azimuth and elevation positions, respecitvely, and $0$, $\epsilon_A$ and $-\epsilon_E$ represent the direction cosines of a target line-of-sight vector.

40. The method of claim 39 wherein the initialization signal is referenced to the fixed coordinate system in accordance with the matrix transform $$\begin{bmatrix} \Delta X_S \\ \Delta Y_S \\ \Delta Z_S \end{bmatrix} = [\psi]^{-1}[\theta]^{-1}[\phi]^{-1}[\lambda a]^{-1}[\lambda e]^{-1} \begin{bmatrix} I_X \\ I_Y \\ I_Z \end{bmatrix}$$

where $\Delta X_S$, $\Delta Y_S$ and $\Delta Z_S$ represent the fixed coordinate system referenced error signals, $[\psi]^{-1}[\theta]^{-1}$ and $[\phi]^{-1}$ represent the inverse matrices of aircraft azimuth, elevation and roll, respectively, $[\lambda a]^{-1}$ and $[\lambda e]^{-1}$ represent the inverse matrices of beam line-of-sight azimuth and elevation positions, respectively, and $I_X$, $I_Y$ and $I_Z$ represent the initial direction cosines of beam line-of-sight in the beam line-of-sight axis system.

41. The method of claim 29 wherein the antenna comprises a radar beam reflector and wherein the beam line-of-sight axis system differs from the beam reflector axis system for substantially all reflector positions, the reflector being driven responsively to the line-of-sight position signal and to reflector position signals in a direction tending to null the error signal.

42. The method of claim 41 wherein the generated error signal is referenced to the fixed coordinate system in accordance with with the matrix transform $$\begin{bmatrix} \Delta X_S \\ \Delta Y_S \\ \Delta Z_S \end{bmatrix} = [\psi]^{-1}[\theta]^{-1}[\phi]^{-1}[T] \begin{bmatrix} 0 \\ \epsilon_A \\ -\epsilon_E \end{bmatrix}$$

where $\Delta X_S$, $\Delta Y_S$ and $\Delta Z_S$ represent the fixed coordinate system referenced error signals, $[\psi]^{-1}[\theta]^{-1}$ and $[\phi]^{-1}$ represent the inverse matrices of aircraft azimuth, elevation and roll, respectively, and $0$, $\epsilon_A$, and $-\epsilon_E$ represent the direction cosines of a target line-of-sight vector, and where 43. The method of claim 42 wherein the initialization signal is referenced to the fixed coordinate system in accordance with the matrix transform $$\begin{bmatrix} \Delta X_S \\ \Delta Y_S \\ \Delta Z_S \end{bmatrix} = [\psi]^{-1}[\theta]^{-1}[\phi]^{-1}[T] \begin{bmatrix} I_X \\ I_Y \\ I_Z \end{bmatrix}$$

where $\Delta X_S$, $\Delta Y_S$ and $\Delta Z_S$ represent the fixed coordinate system referenced error signals, $[\psi]^{-1}[\theta]^{-1}$ and $[\phi]^{-1}$ represent the inverse matrices of aircraft azimuth, elevation and roll, respectively, and $I_X$, $I_Y$ and $I_Z$ represent the initial direction cosines of beam line-of-sight in the beam line-of-sight axis system, and where $$[T] = \begin{bmatrix} (2\cos^2 A_d \cos^2 E_d - 1) & -(\cos^2 E_d \sin 2A_d) & (\cos A_d \sin 2E_d) \\ (\cos^2 E_d \sin 2A_d) & -(2\cos^2 E_d \sin^2 A_d - 1) & (\sin A_d \sin 2E_d) \\ (-\cos A_d \sin 2E_d) & (\sin A_d \sin 2E_d) & (\cos 2E_d) \end{bmatrix}$$

44. A method of driving the reflector of a cassegrain radar antenna in response to a beam line-of-sight referenced, sensed tracking error signal to minimize a tracking error between a beam line-of-sight and a target line-of-sight comprising the steps of:
   a. referencing the beam line-of-sight referenced sensed tracking error signal to a predetermined fixed coordinate system by modifying the tracking error signal in accordance with a predetermined transformation function including a beam derotation function;
   b. modifying the fixed coordinate system referenced tracking error signal in accordance with a predetermined transfer function to generate a fixed coordinate system referenced tracking error rate signal;
   c. integrating the tracking error rate signal from a fixed coordinate system referenced initial condition representing zero tracking error so that the integrated tracking error rate signal represents the position of the line-of-sight to the target in the fixed coordinate system; and,
   d. driving the antenna in response to the line-of-sight position signal and the antenna position signals in a direction tending to null said tracking error signal.

45. A system for positioning a radar beam of a tracking radar system which transmits the radar beam outwardly from the antenna along a beam line-of-sight and receives the radar beam reflected from a target along a target line-of-sight, said positioning system comprising:
   means responsive to the reflected radar beam for generating a target line-of-sight error signal referenced to a fixed coordinate system;
   means for generating a target line-of-sight rate signal in response to said error signal;
   means for generating a target line-of-sight position signal in response to said rate signal; and,
   means for moving the radar beam in a direction tending to null said line-of-sight error signal in response to said target line-of-sight position signal.

46. The positioning system of claim 45 wherein said radar beam moving means comprises:
   an antenna including a movable radar beam reflector and,
   means for driving said radar beam reflector in response to said target line-of-sight position signal.

47. The positioning system of claim 46 wherein said target line-of-sight error signal generating means comprises:
   means for generating a tracking error signal representative of an angular difference between the radar beam line-of-sight and the target line-of-sight; and,
   means for referencing said tracking error signal to said fixed coordinate system.

48. The positioning system of claim 45 wherein said target line-of-sight position generating means comprises:
   means for generating an initialization signal representing an initial condition of zero tracking error; and,
   means for integrating said target line-of-sight rate signal with respect to said initialization signal.

49. The positioning system of claim 48 wherein said target line-of-sight error signal generating means comprises:
   means for generating a tracking error signal representative of an angular difference between the radar beam line-of-sight and the target line-of-sight; and,
   means for referencing said tracking error signal to said fixed coordinate system.

50. The positioning system of claim 49 wherein said radar beam moving means comprises:
   an antenna including a movable radar beam reflector and,
   means for driving said radar beam reflector in response to said target line-of-sight position signal.

* * * * *